(12) United States Patent
Kim

(10) Patent No.: US 12,104,010 B2
(45) Date of Patent: Oct. 1, 2024

(54) POLYMER COMPOSITION FOR AN ELECTRIC CIRCUIT PROTECTION DEVICE

(71) Applicant: Ticona LLC, Florence, KY (US)

(72) Inventor: Young Shin Kim, Cincinnati, OH (US)

(73) Assignee: Ticona LLC, Florence, KY (US)

( * ) Notice: Subject to any disclaimer, the term of this patent is extended or adjusted under 35 U.S.C. 154(b) by 59 days.

(21) Appl. No.: 17/575,941

(22) Filed: Jan. 14, 2022

(65) Prior Publication Data

US 2022/0243004 A1   Aug. 4, 2022

Related U.S. Application Data

(60) Provisional application No. 63/145,683, filed on Feb. 4, 2021.

(51) Int. Cl.
| | |
|---|---|
| *C08G 63/06* | (2006.01) |
| *C08G 63/183* | (2006.01) |
| *C08G 63/189* | (2006.01) |
| *C08K 3/22* | (2006.01) |
| *C08K 3/34* | (2006.01) |
| *H01B 3/42* | (2006.01) |

(52) U.S. Cl.
CPC .......... *C08G 63/065* (2013.01); *C08G 63/183* (2013.01); *C08G 63/189* (2013.01); *C08K 3/22* (2013.01); *C08K 3/34* (2013.01); *H01B 3/423* (2013.01); *C08G 2250/00* (2013.01); *C08K 2003/2227* (2013.01)

(58) Field of Classification Search
CPC .......... C08G 2250/00; C08G 63/065; C08G 63/183; C08G 63/189; C08K 2003/2227; C08K 3/22; C08K 3/34; C08K 3/346; C08L 67/03
See application file for complete search history.

(56) References Cited

U.S. PATENT DOCUMENTS

| | | | |
|---|---|---|---|
| 5,891,532 A | 4/1999 | Furuta et al. | |
| 5,976,406 A | 11/1999 | Nagano et al. | |
| 5,989,758 A | 11/1999 | Komatsu et al. | |
| 6,046,300 A | 4/2000 | Umeetsu et al. | |
| 6,121,369 A | 9/2000 | Stack et al. | |
| 6,140,455 A | 10/2000 | Nagashima et al. | |
| 6,153,121 A | 11/2000 | Makabe et al. | |
| 6,495,616 B2 | 12/2002 | Maeda | |
| 6,582,625 B2 | 6/2003 | Nagashima et al. | |
| 6,656,578 B2 | 12/2003 | Ohbe et al. | |
| 6,733,691 B2 | 5/2004 | Nagano et al. | |
| 7,344,657 B2 | 3/2008 | Okamoto et al. | |
| 7,367,114 B2 | 5/2008 | Rybka et al. | |
| 7,648,748 B2 | 1/2010 | Nakane et al. | |
| 7,824,572 B2 | 11/2010 | Okamoto | |
| 8,066,907 B2 | 11/2011 | Kohinata et al. | |
| 8,142,683 B2 | 3/2012 | Murouchi et al. | |
| 8,192,645 B2 | 6/2012 | Murouchi et al. | |
| 8,231,805 B2 | 7/2012 | Fukuhara et al. | |
| 8,337,719 B2 | 12/2012 | Hosoda et al. | |
| 8,545,719 B2 | 10/2013 | Komatsu et al. | |
| 8,669,341 B2 | 3/2014 | Nair et al. | |
| 8,696,932 B2 | 4/2014 | Uchida et al. | |
| 8,721,921 B2 | 5/2014 | Fukuhara et al. | |
| 8,778,221 B2 | 7/2014 | Nair et al. | |
| 8,778,222 B2 | 7/2014 | Matsubara et al. | |
| 8,852,730 B2 | 10/2014 | Nair et al. | |
| 8,906,258 B2 | 12/2014 | Gray et al. | |
| 9,005,475 B2 | 4/2015 | Nair et al. | |
| 9,045,621 B2 | 6/2015 | Matsubara et al. | |
| 9,045,685 B2 | 6/2015 | Nair et al. | |
| 9,051,514 B2 | 6/2015 | Nair et al. | |
| 9,057,016 B2 | 6/2015 | Nair et al. | |
| 9,096,794 B2 | 8/2015 | Nair et al. | |
| 9,353,263 B2 | 5/2016 | Kim et al. | |
| 9,771,475 B2 | 9/2017 | Komatsu et al. | |
| 9,988,529 B2 | 6/2018 | Lu et al. | |
| 10,912,410 B2 | 2/2021 | Saito | |
| 10,995,272 B2 | 5/2021 | Hara et al. | |
| 11,001,708 B2 | 5/2021 | Hara | |
| 11,084,925 B2 | 8/2021 | Kim | |
| 11,174,342 B2 | 11/2021 | Hara et al. | |
| 11,198,784 B2 | 12/2021 | Komori | |

(Continued)

FOREIGN PATENT DOCUMENTS

| | | |
|---|---|---|
| CN | 101505311 B | 12/2011 |
| CN | 101294002 B | 10/2012 |

(Continued)

OTHER PUBLICATIONS

Technical Data Sheet for Talc HTP4 from IMI Fabi, LLC dated Aug. 2008, 1 page.

(Continued)

*Primary Examiner* — Frances Tischler
*Assistant Examiner* — Gennadiy Mesh
(74) *Attorney, Agent, or Firm* — Dority & Manning, P.A.

(57) ABSTRACT

A polymer composition for use in an electric circuit protection device is provided. The polymer composition comprises a polymer matrix that includes a thermotropic liquid crystalline polymer. The polymer composition exhibits an in-plane thermal conductivity of about 3.5 W/m-K or more as determined in accordance with ASTM E1461-13 and a melt viscosity of from about 1 to about 100 Pa-s as determined in accordance with ISO Test No. 11443:2014 at a temperature 15° C. higher than the melting temperature.

40 Claims, No Drawings

(56) References Cited

U.S. PATENT DOCUMENTS

| | | | |
|---|---|---|---|
| 11,426,903 B2 | 8/2022 | Taguchi et al. | |
| 2004/0034993 A1* | 2/2004 | Rybka | H05K 3/403 |
| | | | 29/830 |
| 2005/0176869 A1* | 8/2005 | Lee | C08L 23/10 |
| | | | 525/224 |
| 2009/0027586 A1 | 1/2009 | Kumai et al. | |
| 2010/0163796 A1* | 7/2010 | Fukuhara | C09K 19/3809 |
| | | | 252/299.61 |
| 2012/0097894 A1* | 4/2012 | Nakayama | C09K 19/3809 |
| | | | 252/299.5 |
| 2012/0232188 A1 | 9/2012 | Nakayama et al. | |
| 2013/0022828 A1* | 1/2013 | Matsubara | C08L 67/00 |
| | | | 524/451 |
| 2013/0052447 A1 | 2/2013 | Grenci et al. | |
| 2013/0053531 A1 | 2/2013 | Nair et al. | |
| 2013/0119317 A1 | 5/2013 | Kim et al. | |
| 2014/0004328 A1 | 1/2014 | Kim et al. | |
| 2014/0171567 A1* | 6/2014 | Guo | C08L 83/04 |
| | | | 524/261 |
| 2017/0145208 A1* | 5/2017 | Lu | C08L 61/16 |
| 2019/0031838 A1 | 1/2019 | Suzuki et al. | |
| 2019/0062520 A1 | 2/2019 | Zimmerman et al. | |
| 2019/0256703 A1* | 8/2019 | Kim | C08K 3/34 |
| 2020/0002485 A1 | 1/2020 | Komatsu et al. | |
| 2020/0308487 A1 | 10/2020 | Hegi | |
| 2021/0269588 A1 | 9/2021 | Washino | |

FOREIGN PATENT DOCUMENTS

| | | |
|---|---|---|
| CN | 102037620 B | 9/2013 |
| CN | 103154133 B | 3/2015 |
| CN | 204332960 U | 5/2015 |
| CN | 105504247 A | 4/2016 |
| CN | 105504697 A | 4/2016 |
| CN | 105504703 A | 4/2016 |
| CN | 10556868 A | 5/2016 |
| CN | 105542136 A | 5/2016 |
| CN | 105585828 A | 5/2016 |
| CN | 105764988 B | 6/2016 |
| CN | 105801822 A | 7/2016 |
| CN | 105801823 A | 7/2016 |
| CN | 105801824 A | 7/2016 |
| CN | 105801826 A | 7/2016 |
| CN | 105837805 A | 8/2016 |
| CN | 105860037 A | 8/2016 |
| CN | 105860445 A | 8/2016 |
| CN | 105885370 A | 8/2016 |
| CN | 104704049 B | 10/2016 |
| CN | 106633678 A | 5/2017 |
| CN | 106633679 A | 5/2017 |
| CN | 106633680 A | 5/2017 |
| CN | 106633705 A | 5/2017 |
| CN | 106633706 A | 5/2017 |
| CN | 106633859 A | 5/2017 |
| CN | 106674928 A | 5/2017 |
| CN | 106674929 A | 5/2017 |
| CN | 106674938 A | 5/2017 |
| CN | 106675021 A | 5/2017 |
| CN | 106751624 A | 5/2017 |
| CN | 107022171 A | 8/2017 |
| CN | 104231564 B | 9/2017 |
| CN | 108137905 A | 6/2018 |
| CN | 209266563 U | 8/2019 |
| CN | 209266570 U | 8/2019 |
| CN | 110446592 A | 11/2019 |
| CN | 109790379 B | 4/2020 |
| CN | 111073224 A | 4/2020 |
| CN | 111117170 A | 5/2020 |
| CN | 108276567 B | 7/2020 |
| CN | 109790381 B | 7/2020 |
| CN | 109790380 B | 8/2020 |
| CN | 109790378 B | 9/2020 |
| CN | 111755874 A | 10/2020 |
| CN | 111808403 A | 10/2020 |
| CN | 108025472 B | 12/2020 |
| CN | 108368329 B | 11/2021 |
| CN | 112789328 B | 2/2022 |
| EP | 0 919 363 A1 | 6/1999 |
| EP | 0 762 437 B1 | 1/2003 |
| EP | 3 004 238 B1 | 12/2019 |
| JP | 3410253 B2 | 5/2003 |
| JP | 3493983 B2 | 2/2004 |
| JP | 4258887 B2 | 4/2009 |
| JP | 4290293 B2 | 7/2009 |
| JP | 2010037364 A | 2/2010 |
| JP | 448140 B2 | 6/2010 |
| JP | 5088160 B2 | 12/2012 |
| JP | 5136324 B2 | 2/2013 |
| JP | 5172279 B2 | 3/2013 |
| JP | 5182240 B2 | 4/2013 |
| JP | 5869983 B2 | 2/2016 |
| JP | 6165553 B2 | 7/2017 |
| JP | 6388749 B1 | 9/2018 |
| JP | 6400861 B2 | 10/2018 |
| JP | 2020084185 A | 6/2020 |
| JP | 6741834 B1 | 8/2020 |
| JP | 6745008 B1 | 8/2020 |
| JP | 6773930 B1 | 10/2020 |
| JP | 2020164738 A | 10/2020 |
| JP | 6837184 B2 | 3/2021 |
| JP | 6840455 B2 | 3/2021 |
| KR | 101743301 B1 | 6/2017 |

OTHER PUBLICATIONS

International Search Report and Written Opinion for PCT/US2022/012478 dated Apr. 14, 2022, 10 pages.

\* cited by examiner

POLYMER COMPOSITION FOR AN ELECTRIC CIRCUIT PROTECTION DEVICE

CROSS REFERENCE TO RELATED APPLICATION

The present application claims filing benefit of U.S. Provisional Patent Application Ser. No. 63/145,683 having a filing date of Feb. 4, 2021, which is incorporated herein by reference in its entirety.

BACKGROUND OF THE INVENTION

Electric circuit protection devices (e.g., resistors) are generally passive two-terminal electrical component that implement electrical resistance as a circuit element. Resistors, for instance, often contain an insulative body (e.g., alumina) in the form of a base substrate for surface-mount resistors or a core for lead-type resistors. A resistive element (e.g., metal) is disposed in contact with the insulative body and electrically connected to one or more electrical terminations that connect the resistor to a circuit. A protective member, such as an organic resin and/or inorganic material (e.g., ceramic), covers at least a portion of the substrate and resistive element to protect them from the external environment. Recently, there has been an increased demand for resistors with a higher power rating and a smaller size and footprint. Unfortunately, however, the insulative body and/or protective member will not support the power rating of these devices without additional help in transferring heat away from the resistor element. This may be accomplished by attaching the device to a much larger thermal "heat sink", which is in contact with a metal base plate or flange. The purpose of the heat sink is to draw heat from the resistor element and then dissipate the heat over a much larger area. Unfortunately, however, such heat sinks tend to occupy a large volume of space, which is undesired. As such, a need currently exists for an electric circuit protection device that has improved thermal conductivity without the need for a heat sink.

SUMMARY OF THE INVENTION

In accordance with one embodiment of the present invention, a polymer composition is disclosed that comprises 100 parts by weight of a polymer matrix that includes a thermotropic liquid crystalline polymer, from about 60 to about 300 parts by weight of mineral particles, and from about 0.1 to about 20 parts by weight of a metal hydroxide, wherein the metal hydroxide has the general formula $M(OH)_aO_b$, where M is a metal, $0 \leq a \leq 3$, and $b=(3-a)/2$. The polymer composition exhibits an in-plane thermal conductivity of about 3.5 W/m-K or more as determined in accordance with ASTM E1461-13 and a melt viscosity of from about 1 to about 100 Pa-s as determined in accordance with ISO Test No. 11443:2014 at a temperature 15° C. higher than the melting temperature.

In accordance with another embodiment of the present invention, an electric circuit protection device is disclosed that comprises a resistive element that is disposed in contact with an insulative body. The resistive element is electrically connected to one or more electrical terminations. Further, a protective member covers at least a portion of the insulative body and the resistive element. The insulative body and/or the protective member comprise a polymer composition containing a polymer matrix that includes a thermotropic liquid crystalline polymer. The polymer composition exhibits an in-plane thermal conductivity of about 3.5 W/m-K or more as determined in accordance with ASTM E1461-13 and a melt viscosity of from about 1 to about 100 Pa-s as determined in accordance with ISO Test No. 11443:2014 at a temperature 15° C. higher than the melting temperature.

Other features and aspects of the present invention are set forth in greater detail below.

DETAILED DESCRIPTION

It is to be understood by one of ordinary skill in the art that the present discussion is a description of exemplary embodiments only, and is not intended as limiting the broader aspects of the present invention.

Generally speaking, the present invention is directed to a polymer composition is particularly suitable for use in an electric circuit protection device. The polymer composition contains a polymer matrix that includes a thermotropic liquid crystalline polymer. Through careful control over the specific nature and concentration of the components employed in the composition, the present inventor has discovered that the resulting composition can be formed that has a unique combination of a high degree of thermal conductivity in combination with good flow properties. The polymer composition may, for example, exhibit an in-plane thermal conductivity of about 3.5 W/m-K or more, in some embodiments about 3.8 W/m-K or more, in some embodiments about 4 W/m-K or more, and in some embodiments, from about 4 to about 10 W/m-K, as determined in accordance with ASTM E 1461-13. The composition may also exhibit a through-plane thermal conductivity of about 0.6 W/m-K or more, in some embodiments about 0.7 W/m-K or more, in some embodiments about 0.8 W/m-K or more, and in some embodiments, from about 0.8 to about 2 W/m-K, as determined in accordance with ASTM E 1461-13. Such high thermal conductivity values allow the composition to be capable of creating a thermal pathway for heat transfer away from an electric circuit protection device within which it is employed. In this manner, "hot spots" can be quickly eliminated and the overall temperature can be lowered during use. Notably, it has been discovered that such a thermal conductivity can be achieved without use of conventional materials having a high degree of intrinsic thermal conductivity. For example, the polymer composition may be generally free of fillers having an intrinsic thermal conductivity of 50 W/m-K or more, in some embodiments 100 W/m-K or more, and in some embodiments, 150 W/m-K or more. Examples of such high intrinsic thermally conductive materials may include, for instance, boron nitride, aluminum nitride, magnesium silicon nitride, graphite (e.g., expanded graphite), silicon carbide, carbon nanotubes, zinc oxide, magnesium oxide, beryllium oxide, zirconium oxide, yttrium oxide, aluminum powder, and copper powder. While it is normally desired to minimize the presence of such high intrinsic thermally conductive materials, they may nevertheless be present in a relatively small percentage in certain embodiments, such as in an amount of about 10 wt. % or less, in some embodiments about 5 wt. % or less, and in some embodiments, from about 0.01 wt. % to about 2 wt. % of the polymer composition.

The melt viscosity of the polymer composition is likewise relatively low, which can not only enhance flowability during processing, but also can synergistically improve thermal conductivity. For example, the polymer composition may have a melt viscosity of from about 1 to about 100 Pa-s, in some embodiments from about 2 to about 80 Pa-s, in some embodiments from about 5 to about 60 Pa-s, and in some embodiments, from about 10 to about 40 Pa-s, as determined at a shear rate of 1,000 seconds$^{-1}$. Melt viscosity may be determined in accordance with ISO Test No. 11443:2014 at a temperature that is 15° C. higher than the melting temperature of the composition (e.g., about 340° C. for a melting temperature of about 325° C.).

Despite having such a high degree of thermal conductivity and low melt viscosity, the polymer composition may nevertheless still exhibit excellent mechanical properties. For example, the composition may exhibit a Charpy unnotched impact strength of about 10 kJ/m$^2$, in some embodiments from about 15 to about 60 kJ/m$^2$, and in some embodiments, from about 20 to about 50 kJ/m$^2$, measured at 23° C. according to ISO Test No. 179-1:2010 (technically equivalent to ASTM D256-10e1). The composition may also exhibit a tensile strength of from about 20 to about 500 MPa, in some embodiments from about 50 to about 400 MPa, and in some embodiments, from about 60 to about 350 MPa; tensile break strain of about 0.5% or more, in some embodiments from about 0.8% to about 15%, and in some embodiments, from about 1% to about 10%; and/or tensile modulus of from about 5,000 MPa to about 30,000 MPa, in some embodiments from about 7,000 MPa to about 25,000 MPa, and in some embodiments, from about 9,000 MPa to about 20,000 MPa. The tensile properties may be determined in accordance with ISO Test No. 527:2019 (technically equivalent to ASTM D638-14) at 23° C. The composition may also exhibit a flexural strength of from about 40 to about 500 MPa, in some embodiments from about 50 to about 400 MPa, and in some embodiments, from about 100 to about 350 MPa; flexural break strain of about 0.5% or more, in some embodiments from about 0.8% to about 15%, and in some embodiments from about 1% to about 10%; and/or flexural modulus of about 7,000 MPa or more, in some embodiments from about 8,000 MPa or more, in some embodiments, from about 9,000 MPa to about 30,000 MPa, and in some embodiments, from about 10,000 MPa to about 25,000 MPa. The flexural properties may be determined in accordance with ISO Test No. 178:2019 (technically equivalent to ASTM D790-10) at 23° C. The composition may also exhibit a deflection temperature under load (DTUL) of about 180° C. or more, in some embodiments from about 200° C. to about 320° C., and in some embodiments, from about 250° C. to about 300° C., as determined according to ISO Test No. 75-2:2013 (technically equivalent to ASTM D648-18) at a specified load of 1.8 MPa.

Various embodiments of the present invention will now be described in more detail.

I. Polymer Composition

A. Polymer Matrix

The polymer matrix typically contains one or more liquid crystalline polymers, generally in an amount of from about 20 wt. % to about 65 wt. %, in some embodiments from about 25 wt. % to about 60 wt. %, and in some embodiments, from about 30 wt. % to about 55 wt. % of the polymer composition. The liquid crystalline polymers are generally classified as "thermotropic" to the extent that they can possess a rod-like structure and exhibit a crystalline behavior in their molten state (e.g., thermotropic nematic state). The polymers have a relatively high melting temperature, such as from about 280° C. to about 400° C., in some embodiments from about 290° C. to about 390° C., and in some embodiments, from about 300° C. to about 380° C. Such polymers may be formed from one or more types of repeating units as is known in the art. A liquid crystalline polymer may, for example, contain one or more aromatic ester repeating units generally represented by the following Formula (I):

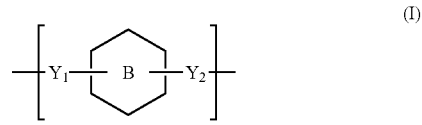

wherein,
ring B is a substituted or unsubstituted 6-membered aryl group (e.g., 1,4-phenylene or 1,3-phenylene), a substituted or unsubstituted 6-membered aryl group fused to a substituted or unsubstituted 5- or 6-membered aryl group (e.g., 2,6-naphthalene), or a substituted or unsubstituted 6-membered aryl group linked to a substituted or unsubstituted 5- or 6-membered aryl group (e.g., 4,4-biphenylene); and $Y_1$ and $Y_2$ are independently O, C(O), NH, C(O)HN, or NHC(O).

Typically, at least one of $Y_1$ and $Y_2$ are C(O). Examples of such aromatic ester repeating units may include, for instance, aromatic dicarboxylic repeating units ($Y_1$ and $Y_2$ in Formula I are C(O)), aromatic hydroxycarboxylic repeating units ($Y_1$ is O and $Y_2$ is C(O) in Formula I), as well as various combinations thereof.

Aromatic hydroxycarboxylic repeating units, for instance, may be employed that are derived from aromatic hydroxycarboxylic acids, such as, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof, and combination thereof. Particularly suitable aromatic hydroxycarboxylic acids are 4-hydroxybenzoic acid ("HBA") and 6-hydroxy-2-naphthoic acid ("HNA"). When employed, repeating units derived from hydroxycarboxylic acids (e.g., HBA and/or HNA) typically constitute about 20 mol. % or more, in some embodiments about 25 mol. % or more, in some embodiments about 30 mol. % or more, in some embodiments about 40 mol. % or more, in some embodiments about 50 mole % or more, in some embodiments from about 55 mol. % to 100 mol. %, and in some embodiments, from about 60 mol. % to about 95 mol. % of the polymer.

Aromatic dicarboxylic repeating units may also be employed that are derived from aromatic dicarboxylic acids, such as terephthalic acid, isophthalic acid, 2,6-naphthalenedicarboxylic acid, diphenyl ether-4,4'-dicarboxylic acid, 1,6-naphthalenedicarboxylic acid, 2,7-naphthalenedicarboxylic acid, 4,4'-dicarboxybiphenyl, bis(4-carboxyphenyl) ether, bis(4-carboxyphenyl)butane, bis(4-carboxyphenyl) ethane, bis(3-carboxyphenyl)ether, bis(3-carboxyphenyl) ethane, etc., as well as alkyl, alkoxy, aryl and halogen substituents thereof, and combinations thereof. Particularly suitable aromatic dicarboxylic acids may include, for instance, terephthalic acid ("TA"), isophthalic acid ("IA"), and 2,6-naphthalenedicarboxylic acid ("NDA"). When employed, repeating units derived from aromatic dicarboxylic acids (e.g., IA, TA, and/or NDA) each typically constitute from about 1 mol. % to about 40 mol. %, in some embodiments from about 2 mol. % to about 30 mol. %, and in some embodiments, from about 5 mol. % to about 25 mol. % of the polymer.

Other repeating units may also be employed in the polymer. In certain embodiments, for instance, repeating units may be employed that are derived from aromatic diols, such as hydroquinone, resorcinol, 2,6-dihydroxynaphthalene, 2,7-dihydroxynaphthalene, 1,6-dihydroxynaphthalene, 4,4'-dihydroxybiphenyl (or 4,4'-biphenol), 3,3'-dihydroxybiphenyl, 3,4'-dihydroxybiphenyl, 4,4'-dihydroxybiphenyl ether, bis(4-hydroxyphenyl)ethane, etc., as well as alkyl, alkoxy, aryl and halogen substituents thereof, and combinations thereof. Particularly suitable aromatic diols may include, for instance, hydroquinone ("HQ") and 4,4'-biphenol ("BP"). When employed, repeating units derived from aromatic diols (e.g., HQ and/or BP) typically constitute from about about 1 mol. % to about 50 mol. %, in some embodiments from about 1 to about 40 mol. %, in some embodiments from about 2 mol. % to about 40 mol. %, in some embodiments from about 5 mol. % to about 35 mol. %, and in some embodiments, from about 5 mol. % to about 25 mol. % of the polymer.

Repeating units may also be employed, such as those derived from aromatic amides (e.g., acetaminophen ("APAP")) and/or aromatic amines (e.g., 4-aminophenol ("AP"), 3-aminophenol, 1,4-phenylenediamine, 1,3-phenylenediamine, etc.). When employed, repeating units derived from aromatic amides (e.g., APAP) and/or aromatic amines (e.g., AP) typically constitute from about 0.1 mol. % to about 20 mol. %, in some embodiments from about 0.5 mol. % to about 15 mol. %, and in some embodiments, from about 1 mol. % to about 10 mol. % of the polymer. It should also be understood that various other monomeric repeating units may be incorporated into the polymer. For instance, in certain embodiments, the polymer may contain one or more repeating units derived from non-aromatic monomers, such as aliphatic or cycloaliphatic hydroxycarboxylic acids, dicarboxylic acids, diols, amides, amines, etc. Of course, in other embodiments, the polymer may be "wholly aromatic" in that it lacks repeating units derived from non-aromatic (e.g., aliphatic or cycloaliphatic) monomers.

In certain embodiments, the liquid crystalline polymer may be a "high naphthenic" polymer to the extent that it contains a relatively high content of repeating units derived from naphthenic hydroxycarboxylic acids and naphthenic dicarboxylic acids, such as NDA, HNA, or combinations thereof. That is, the total amount of repeating units derived from naphthenic hydroxycarboxylic and/or dicarboxylic acids (e.g., NDA, HNA, or a combination of HNA and NDA) is typically about 10 mol. % or more, in some embodiments about 12 mol. % or more, in some embodiments about 15 mol. % or more, in some embodiments about 18 mol. % or more, in some embodiments about 30 mol. % or more, in some embodiments about 40 mol. % or more, in some embodiments about 45 mol. % or more, in some embodiments about 50 mol. % or more, in some embodiments about 60 mol. % or more, in some embodiments about 62 mol. % or more, in some embodiments about 68 mol. % or more, in some embodiments about 70 mol. % or more, and in some embodiments, from about 70 mol. % to about 80 mol. % of the polymer.

In one embodiment, for instance, the repeating units derived from HNA may constitute 30 mol. % or more, in some embodiments about 40 mol. % or more, in some embodiments about 45 mol. % or more, in some embodiments 50 mol. % or more, in some embodiments about 60 mol. % or more, in some embodiments about 62 mol. % or more, in some embodiments about 68 mol. % or more, in some embodiments about 70 mol. % or more, and in some embodiments, from about 70 mol. % to about 80 mol. % of the polymer. The liquid crystalline polymer may also contain various other monomers. For example, the polymer may contain repeating units derived from HBA in an amount of from about 10 mol. % to about 40 mol. %, and in some embodiments from about 15 mol. % to about 35 mol. %, and in some embodiments, from about 20 mol. % to about 30 mol. %. When employed, the molar ratio of HNA to HBA may be selectively controlled within a specific range to help achieve the desired properties, such as from about 0.1 to about 40, in some embodiments from about 0.5 to about 20, in some embodiments from about 0.8 to about 10, and in some embodiments, from about 1 to about 5. The polymer may also contain aromatic dicarboxylic acid(s) (e.g., IA and/or TA) in an amount of from about 1 mol. % to about 40 mol. %, and in some embodiments, from about 5 mol. % to about 25 mol. %; and/or aromatic diol(s) (e.g., BP and/or HQ) in an amount of from about 1 mol. % to about 40 mol. %, and in some embodiments, from about 5 mol. % to about 25 mol. %. In some cases, however, it may be desired to minimize the presence of such monomers in the polymer to help achieve the desired properties. For example, the total amount of aromatic dicarboxylic acid(s) (e.g., IA and/or TA) may be about 20 mol % or less, in some embodiments about 15 mol. % or less, in some embodiments about 10 mol. % or less, in some embodiments, from 0 mol. % to about 5 mol. %, and in some embodiments, from 0 mol. % to about 2 mol. % of the polymer. Similarly, the total amount of aromatic dicarboxylic acid(s) (e.g., IA and/or TA) may be about 20 mol % or less, in some embodiments about 15 mol. % or less, in some embodiments about 10 mol. % or less, in some embodiments, from 0 mol. % to about 5 mol. %, and in some embodiments, from 0 mol. % to about 2 mol. % of the polymer (e.g., 0 mol. %).

In another embodiment, the repeating units derived from NDA may constitute 10 mol. % or more, in some embodiments about 12 mol. % or more, in some embodiments about 15 mol. % or more, and in some embodiments, from about 18 mol. % to about 95 mol. % of the polymer. In such embodiments, the liquid crystalline polymer may also contain various other monomers, such as aromatic hydroxycarboxylic acid(s) (e.g., HBA) in an amount of from about 20 mol. % to about 60 mol. %, and in some embodiments, from about 30 mol. % to about 50 mol. %; aromatic dicarboxylic acid(s) (e.g., IA and/or TA) in an amount of from about 2 mol. % to about 30 mol. %, and in some embodiments, from about 5 mol. % to about 25 mol. %; and/or aromatic diol(s) (e.g., BP and/or HQ) in an amount of from about 2 mol. % to about 40 mol. %, and in some embodiments, from about 5 mol. % to about 35 mol. %.

B. Mineral Particles

The polymer composition also contains mineral particles that are distributed within the polymer matrix. Such mineral particles typically constitute from about 60 to about 300 parts by weight, in some embodiments from about 80 to about 250 parts by weight, in some embodiments from about 90 to about 225 parts by weight, and in some embodiments, from about 100 to about 200 parts by weight per 100 parts by weight of the polymer matrix. The mineral particles may, for instance, constitute from about 30 wt. % to about 70 wt. %, in some embodiments from about 35 wt. % to about 65 wt. %, and in some embodiments, from about 40 wt. % to about 60 wt. % of the polymer composition. The particles are typically formed from a natural and/or synthetic silicate mineral, such as talc, mica, halloysite, kaolinite, illite, montmorillonite, vermiculite, palygorskite, pyrophyllite, calcium silicate, aluminum silicate, wollastonite, etc. Talc is particularly suitable for use in the polymer composition. The shape of the particles may vary as desired, such as granular, flake-shaped, etc. The particles typically have a median particle diameter (D50) of from about 1 to about 25 micrometers, in some embodiments from about 2 to about 15 micrometers, and in some embodiments, from about 4 to about 10 micrometers, as determined by sedimentation analysis (e.g., Sedigraph 5120). If desired, the particles may also have a high specific surface area, such as from about 1 square meters per gram ($m^2/g$) to about 50 $m^2/g$, in some embodiments from about 1.5 $m^2/g$ to about 25 $m^2/g$, and in some embodiments, from about 2 $m^2/g$ to about 15 $m^2/g$. Surface area may be determined by the physical gas adsorption (BET) method (nitrogen as the adsorption gas) in accordance with DIN 66131:1993. The moisture content may also be relatively low, such as about 5% or less, in some embodiments about 3% or less, and in some embodiments, from about 0.1 to about 1% as determined in accordance with ISO 787-2:1981 at a temperature of 105° C.

C. Metal Hydroxide

In addition to mineral particles, such as described above, a metal hydroxide is also distributed within the polymer matrix. The metal hydroxide particles typically constitute from about 0.1 to about 20 parts by weight, in some embodiments from about 0.3 to about 10 parts by weight, in some embodiments from about 0.5 to about 5 parts by weight, and in some embodiments, from about 0.8 to about 3 parts by weight per 100 parts by weight of the polymer matrix. The metal hydroxide may, for instance, constitute from about 0.01 wt. % to about 5 wt. %, in some embodiments from about 0.05 wt. % to about 2 wt. %, and in some embodiments, from about 0.1 wt. % to about 1 wt. % of the polymer composition. The metal hydroxide typically has the general formula $M(OH)_aO_b$, where (e.g., 3) and b=(3-a)/2, where M is a metal, such as a transition metal (e.g., copper), alkali metal (e.g., potassium sodium, etc.), alkaline earth metal (e.g., calcium, magnesium, etc.), post-transition group metal (e.g., aluminum), and so forth. Particularly suitable metals include aluminum and magnesium. Without intending to be limited by theory, it is believed that such compounds can effectively "lose" water under the process conditions (e.g., high temperature), which can assist in melt viscosity reduction and improve the flow properties of the polymer composition. Examples of suitable metal hydroxides may include, for instance, copper (II) hydroxide ($Cu(OH)_2$), potassium hydroxide (KOH), sodium hydroxide (NaOH), magnesium hydroxide ($Mg(OH)_2$), calcium hydroxide ($Ca(OH)_2$), aluminum hydroxide ($Al(OH)_3$), and so forth. The metal hydroxide is typically in the form of particles. In one particular embodiment, for example, the metal hydroxide particles include aluminum hydroxide and optionally exhibit a gibbsite crystal phase. The particles may have a relatively small size, such as a median diameter of from about 50 nanometers to about 3,000 nanometers, in some embodiments from about 100 nanometers to about 2,000 nanometers, and in some embodiments, from about 500 nanometers to about 1,500 nanometers. The term "median" diameter as used herein refers to the "D50" size distribution of the particles, which is the point at which 50% of the particles have a smaller size. The particles may likewise have a D90 size distribution within the ranges noted above. The diameter of particles may be determined using known techniques, such as by ultracentrifuge, laser diffraction, etc. For example, particle size distribution can be determined with laser diffraction according to ISO 13320:2020.

D. Optional Components

A wide variety of additional additives can also be included in the polymer composition, such as fibrous fillers (e.g., glass fibers), impact modifiers, lubricants, pigments (e.g., carbon black), antioxidants, stabilizers, surfactants, waxes, flame retardants, anti-drip additives, nucleating agents (e.g., boron nitride), electrically conductive fillers, and other materials added to enhance properties and processability. Lubricants, for example, may be employed in the polymer composition in an amount from about 0.05 wt. % to about 1.5 wt. %, and in some embodiments, from about 0.1 wt. % to about 0.5 wt. % (by weight) of the polymer composition. Examples of such lubricants include fatty acids esters, the salts thereof, esters, fatty acid amides, organic phosphate esters, and hydrocarbon waxes of the type commonly used as lubricants in the processing of engineering plastic materials, including mixtures thereof. Suitable fatty acids typically have a backbone carbon chain of from about 12 to about 60 carbon atoms, such as myristic acid, palmitic acid, stearic acid, arachic acid, montanic acid, octadecinic acid, parinric acid, and so forth. Suitable esters include fatty acid esters, fatty alcohol esters, wax esters, glycerol esters, glycol esters and complex esters. Fatty acid amides include fatty primary amides, fatty secondary amides, methylene and ethylene bisamides and alkanolamides such as, for example, palmitic acid amide, stearic acid amide, oleic acid amide, N,N'-ethylenebisstearamide and so forth. Also suitable are the metal salts of fatty acids such as calcium stearate, zinc stearate, magnesium stearate, and so forth; hydrocarbon waxes, including paraffin waxes, polyolefin and oxidized polyolefin waxes, and microcrystalline waxes. Particularly suitable lubricants are acids, salts, or amides of stearic acid, such as pentaerythritol tetrastearate, calcium stearate, or N,N'-ethylenebisstearamide.

II. Formation

The components of the polymer composition may be melt processed or blended together. The components may be supplied separately or in combination to an extruder that includes at least one screw rotatably mounted and received within a barrel (e.g., cylindrical barrel) and may define a feed section and a melting section located downstream from the feed section along the length of the screw. The extruder may be a single screw or twin screw extruder. The speed of the screw may be selected to achieve the desired residence time, shear rate, melt processing temperature, etc. For example, the screw speed may range from about 50 to about 800 revolutions per minute ("rpm"), in some embodiments from about 70 to about 150 rpm, and in some embodiments, from about 80 to about 120 rpm. The apparent shear rate during melt blending may also range from about 100 seconds$^{-1}$ to about 10,000 seconds$^{-1}$, in some embodiments from about 500 seconds$^{-1}$ to about 5000 seconds$^{-1}$, and in some embodiments, from about 800 seconds$^{-1}$ to about 1200 seconds$^{-1}$. The apparent shear rate is equal to 4 $Q/\pi R^3$, where Q is the volumetric flow rate ("$m^3/s$") of the polymer melt and R is the radius ("m") of the capillary (e.g., extruder die) through which the melted polymer flows.

III. Electric Circuit Protection Device

As indicated above, the polymer composition may be employed in the formation of an electric circuit protection device, such as a resistor. The device may, for instance, contain an insulative body in the form of a base substrate (e.g., for surface-mount resistors) or a core (e.g., for lead-type resistors). The insulative body may, for instance, have a parallelepiped, rectangular, or cylindrical shape. A resistive element (e.g., metal) is disposed in contact with the insulative body and electrically connected to one or more electrical terminations (e.g., wires, plates, sheets, etc.) that are capable of connecting the resistor to a circuit. In one embodiment, for example, the resistive element may be connected to opposing first and second electrical terminations. The resistive element may be formed on a surface (e.g., top, bottom, or end) and/or embedded within the insulative body. A protective member covers at least a portion of the insulative body and resistive element to protect them from the external environment. For example, the protective member may be coated onto the resistive element and at least a portion of the insulative body. The electrical terminations may be in electrical connection with a circuit having a source of electrical power to cause a current to pass through the device. For example, the circuit may contain a power supply, a load, and the circuit protection device, which is typically connected in series with the power source and load.

The insulative body and/or protective member of the device may be formed from the polymer composition of the present invention. For example, the polymer composition may be molded to form the insulative body and/or protective member using known techniques, such as injection molding, low-pressure injection molding, extrusion compression molding, gas injection molding, foam injection molding, low-pressure gas injection molding, low-pressure foam injection molding, gas extrusion compression molding, foam extrusion compression molding, extrusion molding, foam extrusion molding, compression molding, foam compression molding, gas compression molding, etc. For example, an injection molding system may be employed that includes a mold within which the polymer composition may be injected. The time inside the injector may be controlled and optimized so that polymer matrix is not pre-solidified. When the cycle time is reached and the barrel is full for discharge, a piston may be used to inject the composition to the mold cavity. Compression molding systems may also be employed. As with injection molding, the shaping of the polymer composition into the desired article also occurs within a mold. The composition may be placed into the compression mold using any known technique, such as by being picked up by an automated robot arm. The temperature of the mold may be maintained at or above the solidification temperature of the polymer matrix for a desired time period to allow for solidification. The molded product may then be solidified by bringing it to a temperature below that of the melting temperature. The resulting product may be de-molded. The cycle time for each molding process may be adjusted to suit the polymer matrix, to achieve sufficient bonding, and to enhance overall process productivity.

Test Methods

Melt Viscosity: The melt viscosity (Pa-s) may be determined in accordance with ISO Test No. 11443:2014 at a shear rate of 1,000 s$^{-1}$ and temperature 15° C. above the melting temperature using a Dynisco LCR7001 capillary rheometer. The rheometer orifice (die) had a diameter of 1 mm, length of 20 mm, L/D ratio of 20.1, and an entrance angle of 180°. The diameter of the barrel was 9.55 mm+0.005 mm and the length of the rod was 233.4 mm.

Melting Temperature: The melting temperature ("Tm") may be determined by differential scanning calorimetry ("DSC") as is known in the art. The melting temperature is the differential scanning calorimetry (DSC) peak melt temperature as determined by ISO Test No. 11357-2:2020. Under the DSC procedure, samples were heated and cooled at 20° C. per minute as stated in ISO Standard 10350 using DSC measurements conducted on a TA Q2000 Instrument.

Deflection Temperature Under Load ("DTUL"): The deflection under load temperature may be determined in accordance with ISO Test No. 75-2:2013 (technically equivalent to ASTM D648-18). More particularly, a test strip sample having a length of 80 mm, thickness of 10 mm, and width of 4 mm may be subjected to an edgewise three-point bending test in which the specified load (maximum outer fibers stress) was 1.8 Megapascals. The specimen may be lowered into a silicone oil bath where the temperature is raised at 2° C. per minute until it deflects 0.25 mm (0.32 mm for ISO Test No. 75-2:2013).

Tensile Modulus, Tensile Stress, and Tensile Elongation: Tensile properties may be tested according to ISO Test No. 527:2019 (technically equivalent to ASTM D638-14). Modulus and strength measurements may be made on the same test strip sample having a length of 80 mm, thickness of 10 mm, and width of 4 mm. The testing temperature may be 23° C., and the testing speeds may be 1 or 5 mm/min.

Flexural Modulus, Flexural Stress, and Flexural Elongation: Flexural properties may be tested according to ISO Test No. 178:2019 (technically equivalent to ASTM D790-10). This test may be performed on a 64 mm support span. Tests may be run on the center portions of uncut ISO 3167 multi-purpose bars. The testing temperature may be 23° C. and the testing speed may be 2 mm/min.

Charpy Impact Strength: Charpy properties may be tested according to ISO Test No. ISO 179-1:2010) (technically equivalent to ASTM D256-10, Method B). This test may be run using a Type 1 specimen size (length of 80 mm, width of 10 mm, and thickness of 4 mm). When testing the notched impact strength, the notch may be a Type A notch (0.25 mm base radius). Specimens may be cut from the center of a multi-purpose bar using a single tooth milling machine. The testing temperature may be 23° C.

Example

Samples 1-5 are formed for use in an electric circuit protection device as described herein. The samples are formed from various combinations of a first liquid crystalline polymer ("LOP 1"), a second liquid crystalline polymer ("LOP 2"), talc particles, and aluminum hydroxide ("ATH"). LCP 1 is formed from 43% HBA, 20% NDA, 9% TA, and 28% HQ. LCP 2 is formed from 48% HNA, 2% HBA, 25% TA, and 25% BP. The talc particles have a D50 median diameter of 7.5 micrometers (Sedigraph 5120), BET specific surface area of 3.8 m$^2$/g, and moisture content at 105° C. of no more than 0.4%. ATH is in the form of particles having a D50 median diameter of approximately 1 micrometer. Compounding is performed using a 32-mm twin screw extruder.

TABLE 1

| Sample | 1 (wt. %) | 2 (wt. %) | 3 (wt. %) | 4 (wt. %) | 5 (wt. %) |
|---|---|---|---|---|---|
| LCP 1 | 46 | 46 | 50.8 | — | — |
| LCP 2 | — | — | — | 39.7 | 39.5 |
| Talc | 54 | 54 | 49 | 60 | 60 |
| ATH | 0.2 | 0.4 | 0.2 | 0.3 | 0.5 |

The resulting samples are injection molded into ISO tensile bars and tested for thermal and mechanical properties. The results are set forth below in Table 2.

TABLE 2

|  | 1 | 2 | 3 | 4 | 5 |
|---|---|---|---|---|---|
| In-Plane Thermal Conductivity (W/m-K) | 4.2 | 4.8 | 4.1 | 5.1 | 5.1 |
| Through-Plane Thermal Conductivity (W/m-K) | 0.7 | 0.8 | 0.7 | 1.0 | 1.0 |
| Melting Temperature (° C., 1$^{st}$ heat of DSC) | 319.1 | 318.0 | 39.1 | 343.4 | 338.2 |
| Melt Viscosity at 1,000 s$^{-1}$ (Pa-s) | 51.9 | 29.7 | 37.9 | 36.5 | 28.6 |
| Unnotched Charpy (kJ/m$^2$) | 20.0 | 13.0 | 9.3 | 4.5 | 3.5 |
| Notched Charpy (kJ/m$^2$) | 2.5 | 2.5 | 1.8 | 1.3 | 1.2 |
| Tensile Strength (MPa) | 74 | 82 | 83 | 65 | 50 |
| Tensile Modulus (MPa) | 9,710 | 9,427 | 9,535 | 11,195 | 11,546 |
| Tensile Elongation (%) | 1.6 | 2.1 | 2.4 | 0.8 | 0.7 |
| Flexural Strength (MPa) | 97 | 109 | 113 | 101 | 94 |
| Flexural Modulus (MPa) | 9,618 | 9,410 | 9,766 | 13,093 | 13,958 |
| Flexural Elongation (%) | 1.8 | 2.3 | 2.8 | 1.2 | 1.0 |
| DTUL (1.8 MPa, ° C.) | 256 | 261 | 260 | 279 | 273 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A polymer composition comprising:
   100 parts by weight of a polymer matrix that includes a thermotropic liquid crystalline polymer;
   from 60 to 300 parts by weight of mineral particles; and
   from 0.1 to 20 parts by weight of a metal hydroxide, wherein the metal hydroxide has the general formula $M(OH)_aO_b$, where M is a metal, $0 \leq a \leq 3$, and $b=(3-a)/2$;
   wherein the polymer composition exhibits an in-plane thermal conductivity of 4.0 W/m-K or more as determined in accordance with ASTM E1461-13 and a melt viscosity of from 1 to 100 Pa-s as determined in accordance with ISO Test No. 11443:2014 at a temperature 15° C. higher than the melting temperature.

2. The polymer composition of claim 1, wherein the polymer composition exhibits a through-plane thermal conductivity of 0.6 W/m-K or more as determined in accordance with ASTM E 1461-13.

3. The polymer composition of claim 1, wherein the polymer composition exhibits an in-plane thermal conductivity of more than 4 to 10 W/m-K and a through-plane thermal conductivity of from 0.8 to 2 W/m-K, as determined in accordance with ASTM E 1461-13.

4. The polymer composition of claim 1, wherein the polymer composition exhibits a melt viscosity of from 5 to 60 Pa-s as determined in accordance with ISO Test No. 11443:2014 at a temperature 15° C. higher than the melting temperature.

5. The polymer composition of claim 1, wherein the polymer matrix constitutes from 20 wt. % to 65 wt. % of the polymer composition.

6. The polymer composition of claim 1, wherein the liquid crystalline polymer has a melting temperature of 280° C. to 400° C.

7. The polymer composition of claim 1, wherein the liquid crystalline polymer contains repeating units derived from one or more aromatic dicarboxylic acids, one or more aromatic hydroxycarboxylic acids, or a combination thereof.

8. The polymer composition of claim 7, wherein the aromatic hydroxycarboxylic acids include 4-hydroxybenzoic acid, 6-hydroxy-2-naphthoic acid, or a combination thereof.

9. The polymer composition of claim 7, wherein the aromatic dicarboxylic acids include terephthalic acid, isophthalic acid, 2,6-naphthalenedicarboxylic acid, or a combination thereof.

10. The polymer composition of claim 7, wherein the liquid crystalline polymer further contains repeating units derived from one or more aromatic diols.

11. The polymer composition of claim 10, wherein the aromatic diols include hydroquinone, 4,4'-biphenol, or a combination thereof.

12. The polymer composition of claim 1, wherein the liquid crystalline polymer is wholly aromatic.

13. The polymer composition of claim 1, wherein the liquid crystalline polymer contains repeating units derived from naphthenic hydroxycarboxylic and/or dicarboxylic acids in an amount of 10 mol. % or more.

14. The polymer composition of claim 13, wherein the liquid crystalline polymer contains repeating units derived from 6-hydroxy-2-naphthoic acid in an amount of 30 mol. % or more.

15. The polymer composition of claim 13, wherein the liquid crystalline polymer contains repeating units derived from 2,6-naphthalenedicarboxylic acid in an amount of 10 mol. % or more.

16. The polymer composition of claim 1, wherein the mineral particles constitute from 40 wt. % to 60 wt. % of the polymer composition and the metal hydroxide constitutes from 0.01 wt. % to5 wt. % of the polymer composition.

17. The polymer composition of claim 1, wherein the mineral particles include talc.

18. The polymer composition of claim 1, wherein the mineral particles have a median diameter of from 1 to 25 micrometers, specific surface area of from 1 to 50 m$^2$/g as determined in accordance with DIN 66131:1993, and/or moisture content of 5% or less as determined in accordance with ISO 787-2:1981 at a temperature of 105° C.

19. The polymer composition of claim 1, wherein the metal hydroxide includes aluminum hydroxide.

20. The polymer composition of claim 1, wherein the polymer composition is free of fillers having an intrinsic thermal conductivity of 100 W/m-K or more.

21. An electric circuit protection device comprising the polymer composition of claim 1.

22. The electric circuit protection device of claim 21, wherein the device comprises a resistive element that is disposed in contact with an insulative body, wherein the resistive element is electrically connected to one or more electrical terminations, and further wherein a protective member covers at least a portion of the insulative body and the resistive element.

23. The electric circuit protection device of claim 22, wherein the insulative body and/or the protective member comprise the polymer composition.

24. An electric circuit protection device comprising a resistive element that is disposed in contact with an insulative body, wherein the resistive element is electrically connected to one or more electrical terminations, and wherein a protective member covers at least a portion of the insulative body and the resistive element, wherein the insulative body and/or the protective member comprise the polymer composition of claim 1.

25. The electric circuit protection device of claim 24, wherein the polymer composition comprises from 80 to 250 parts by weight of mineral particles per 100 parts by weight of the polymer matrix and from 0.3 to 10 parts by weight of the metal hydroxide per 100 parts by weight of the polymer matrix.

26. The electric circuit protection device of claim 25, wherein the mineral particles include talc.

27. The electric circuit protection device of claim 25, wherein the metal hydroxide includes aluminum hydroxide.

28. The electric circuit protection device of claim 24, wherein the liquid crystalline polymer contains repeating units derived from one or more aromatic dicarboxylic acids, one or more aromatic hydroxycarboxylic acids, or a combination thereof.

29. The electric circuit protection device of claim 28, wherein the aromatic hydroxycarboxylic acids include 4-hydroxybenzoic acid, 6-hydroxy-2-naphthoic acid, or a combination thereof.

30. The electric circuit protection device of claim 28, wherein the aromatic dicarboxylic acids include terephthalic acid, isophthalic acid, 2,6-naphthalenedicarboxylic acid, or a combination thereof.

31. The electric circuit protection device of claim 28, wherein the liquid crystalline polymer further contains repeating units derived from one or more aromatic diols.

32. The electric circuit protection device of claim 31, wherein the aromatic diols include hydroquinone, 4,4'-biphenol, or a combination thereof.

33. The electric circuit protection device of claim 24, wherein the liquid crystalline polymer is wholly aromatic.

34. The electric circuit protection device of claim 24, wherein the liquid crystalline polymer contains repeating units derived from naphthenic hydroxycarboxylic and/or dicarboxylic acids in an amount of 10 mol. % or more.

35. The electric circuit protection device of claim 34, wherein the liquid crystalline polymer contains repeating units derived from 6-hydroxy-2-naphthoic acid in an amount of 30 mol. % or more.

36. The electric circuit protection device of claim 34, wherein the liquid crystalline polymer contains repeating units derived from 2,6-naphthalenedicarboxylic acid in an amount of 10 mol. % or more.

37. The electric circuit protection device of claim 24, wherein the polymer composition is free of fillers having an intrinsic thermal conductivity of 100 W/m-K or more.

38. The electric circuit protection device of claim 21, wherein the insulative body comprises the polymer composition.

39. The electric circuit protection device of claim 21, wherein the protective member comprises the polymer composition.

40. A circuit comprising a power supply, load, and the electric circuit protection device of claim 21.

* * * * *